(12) United States Patent
Elzur

(10) Patent No.: US 12,412,231 B2
(45) Date of Patent: Sep. 9, 2025

(54) GRAPHICS PROCESSING UNIT WITH NETWORK INTERFACES

(71) Applicant: Intel Corporation, Santa Clara, CA (US)

(72) Inventor: Uri Elzur, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 17/853,793

(22) Filed: Jun. 29, 2022

(65) Prior Publication Data

US 2022/0335563 A1 Oct. 20, 2022

Related U.S. Application Data

(60) Provisional application No. 63/218,832, filed on Jul. 6, 2021.

(51) Int. Cl.
| | |
|---|---|
| *G06T 1/20* | (2006.01) |
| *G06F 13/42* | (2006.01) |
| *G06T 1/60* | (2006.01) |
| *H04L 41/08* | (2022.01) |
| *H04L 41/0803* | (2022.01) |

(52) U.S. Cl.
CPC .......... *G06T 1/20* (2013.01); *G06F 13/4282* (2013.01); *G06T 1/60* (2013.01); *H04L 41/0803* (2013.01); *G06F 2213/3808* (2013.01)

(58) Field of Classification Search
None
See application file for complete search history.

(56) References Cited

U.S. PATENT DOCUMENTS

| | | | | |
|---|---|---|---|---|
| 6,393,483 | B1 * | 5/2002 | Latif | H04L 41/22 |
| | | | | 370/359 |
| 9,600,429 | B2 * | 3/2017 | Pope | G06F 13/4282 |
| 9,602,437 | B1 * | 3/2017 | Bernath | H04L 49/9084 |
| 10,997,106 | B1 * | 5/2021 | Bandaru | G06F 13/385 |
| 11,150,963 | B2 * | 10/2021 | Nainar | G06F 9/541 |
| 11,531,752 | B2 * | 12/2022 | Abodunrin | G06F 21/53 |

(Continued)

FOREIGN PATENT DOCUMENTS

| | | | |
|---|---|---|---|
| CN | 102413031 B | 4/2012 | |
| WO | WO-2020172692 A2 * | 8/2020 | ........... G06F 9/5077 |

(Continued)

OTHER PUBLICATIONS

'UNO: Unifying Host and Smart NIC Offload for Flexible Packet Processing' by Yanfang Le et al., SoCC '17, Sep. 24-27, 2017. (Year: 2017).*

(Continued)

*Primary Examiner* — Steven G Snyder
(74) *Attorney, Agent, or Firm* — Compass IP Law PC

(57) ABSTRACT

Examples described herein relate to a first graphics processing unit (GPU) comprising at least one integrated network interface controller (NIC), wherein a data plane of the at least one integrated NIC is configured by a particular entity. In some examples, the data plane of the at least one integrated NIC is configured by the particular entity as a control plane but the first GPU and a central processing unit (CPU) are prevented from configuring the data plane of the at least one integrated NIC.

20 Claims, 13 Drawing Sheets

(56) References Cited

U.S. PATENT DOCUMENTS

| | | | |
|---|---|---|---|
| 11,645,104 B2* | 5/2023 | Rajagopal | G06F 9/45558 718/1 |
| 11,863,376 B2* | 1/2024 | Ang | H04L 41/0803 |
| 11,995,024 B2* | 5/2024 | Ang | G06F 13/387 |
| 12,206,554 B2* | 1/2025 | Choudhury | H04L 41/0893 |
| 2007/0139423 A1 | 6/2007 | Kong et al. | |
| 2007/0273699 A1 | 11/2007 | Sasaki et al. | |
| 2010/0013839 A1* | 1/2010 | Rawson | G06F 3/14 345/520 |
| 2014/0098113 A1* | 4/2014 | Sabony | G06T 1/20 345/519 |
| 2014/0223131 A1 | 8/2014 | Agarwal et al. | |
| 2016/0337193 A1* | 11/2016 | Rao | H04L 67/63 |
| 2017/0180272 A1* | 6/2017 | Bernath | H04L 49/901 |
| 2018/0314638 A1* | 11/2018 | LeBeane | G06F 12/1081 |
| 2018/0349062 A1 | 12/2018 | Sines | |
| 2019/0042741 A1* | 2/2019 | Abodunrin | G06F 13/4068 |
| 2020/0226096 A1 | 7/2020 | Koker et al. | |
| 2020/0278892 A1* | 9/2020 | Nainar | H04L 67/10 |
| 2021/0203704 A1* | 7/2021 | Pohl | A63F 13/355 |
| 2022/0085916 A1 | 3/2022 | Debbage et al. | |
| 2022/0100491 A1* | 3/2022 | Voltz | G06F 8/65 |
| 2022/0197681 A1* | 6/2022 | Rajagopal | G06F 9/45558 |
| 2023/0041806 A1* | 2/2023 | Singh | H04L 63/0428 |
| 2023/0195675 A1* | 6/2023 | Ang | G06F 13/387 710/313 |
| 2023/0198833 A1* | 6/2023 | Ang | H04L 41/0806 709/220 |

FOREIGN PATENT DOCUMENTS

| | | |
|---|---|---|
| WO | 2020190798 A1 | 9/2020 |
| WO | 2020190801 A1 | 9/2020 |

OTHER PUBLICATIONS

'P4NFV: P4 Enabled NFV Systems with SmartNICs' by Ali Mohammadkhan et al., 2019 IEEE Conference on Network Function Virtualization and Software Defined Networks (NFV-SDN). (Year: 2019).*

'HyperV: A High Performance Hypervisor for Virtualization of the Programmable Data Plane' by Cheng Zhang et al., 2017 26th International Conference on Computer Communication and Networks (ICCCN), Jul. 2017. (Year: 2017).*

'HyperVDP: High-Performance Virtualization of the Programmable Data Plane' by Cheng Zhang et al., IEEE Journal On Selected Areas in Communications, vol. 37, No. 3, Mar. 2019. (Year: 2019).*

'Enhancing Networks with SmartNICs' by Mellanox, copyright 2018. (Year: 2018).*

AWS, "Amazon EC2 P4 Instances", https://aws.amazon.com/ec2/instance-types/p4/, Nov. 2, 2020, 8 pages.

Bouffler, Brendan, "In the search for performance, there's more than one way to build a network", AWS HPC Blog, https://aws.amazon.com/blogs/hpc/in-the-search-for-performance-theres-more-than-one-way-to-build-a-network/, Jun. 22, 2021, 5 pages.

Gebara, Nadeen et al., "In-Network Aggregation for Shared Machine Learning Clusters", Proceedings of the 4th MLSys Conference, San Jose, CA, USA, 2021, 16 pages.

NVIDIA, "DGX Station A100 User Guide", DU-10189-001 v5.0.2, https://docs.nvidia.com/dgx/dgx-station-a100-user-guide/index.html, Nov. 2022, 74 pages.

Singhvi, Arjun et al., "1RMA: Re-envisioning Remote Memory Access for Multi-tenant Datacenters", SIGCOMM '20, Aug. 10-14, 2020, Virtual Event, NY, USA, 14 pages.

International Search Report and Written Opinion for PCT Patent Application No. PCT/US22/36397, Mailed Oct. 24, 2022, 12 pages.

U.S. Appl. No. 17/853,711, filed Jun. 29, 2022, 71 pages.

Notice of Allowance for U.S. Appl. No. 17/853,711, Mailed Aug. 29, 2024, 10 pages.

Klenk M Benjamin: "Communication Architectures for Scalable GPU-centric Computing Systems", Dec. 31, 2017 (Dec. 31, 2017), XP055774858, Retrieved from the Internet: URL:https://archiv.ub.uni-heidelberg.de/volltextserver/23954/1/bklenk_dissertation_final.pdf [retrieved on Feb. 11, 2021], 217 pages.

Partial European Search Report for Patent Application No. 22838425.1, Mailed Apr. 24, 2025, 14 pages.

* cited by examiner

GRAPHICS PROCESSING UNIT WITH NETWORK INTERFACES

RELATED APPLICATION

This application claims priority to U.S. Provisional Application No. 63/218,832, filed Jul. 6, 2021. The entire contents of that application are incorporated by reference in its entirety.

BACKGROUND

In Infrastructure-as-a-service (IaaS) or as part of a composable Data Center (DC), applications and other software share utilization of central processing units (CPUs), field programmable gate arrays (FPGAs), graphics processing units (GPUs), memory devices, and other devices. As Deep Learning (DL) training workloads grow in size, even exponentially, multiple GPUs are utilized. The size, scale, and complexity of modern DL workloads training leads to use of a dedicated scale out fabric (e.g., an internodal connectivity scheme) to provide network bandwidth for DL training workloads. For sharing an installed GPU cluster with multiple tenants and/or for workloads shared across multiple GPUs, some GPUs are attached to a Cloud Service Provider (CSP) DC network and use smartNICs (e.g., Amazon Web Service (AWS) P4 d instance) to access the DC network, in compliance with CSP access policies. Other CSPs utilize a proprietary pod with a technology different than the DC network technology with higher bandwidth for training workloads.

Current approaches to connect a GPU server to a CSP DC network include utilization of scale out network interface controllers (NICs) and ability to support the varying requirements of different CSPs who may deploy different technologies, different topologies and/or different security/privacy/ isolation policies. As the network space evolves rapidly, the requirements and technologies may frequently change. However, many of these approaches utilize smartNICs, that can incur relatively high cost, high power, and high board space, but can deliver relatively small bandwidth for GPU-to-GPU communications and for GPU-to-CPU communications over the DC network.

DETAILED DESCRIPTION

Figure 1:
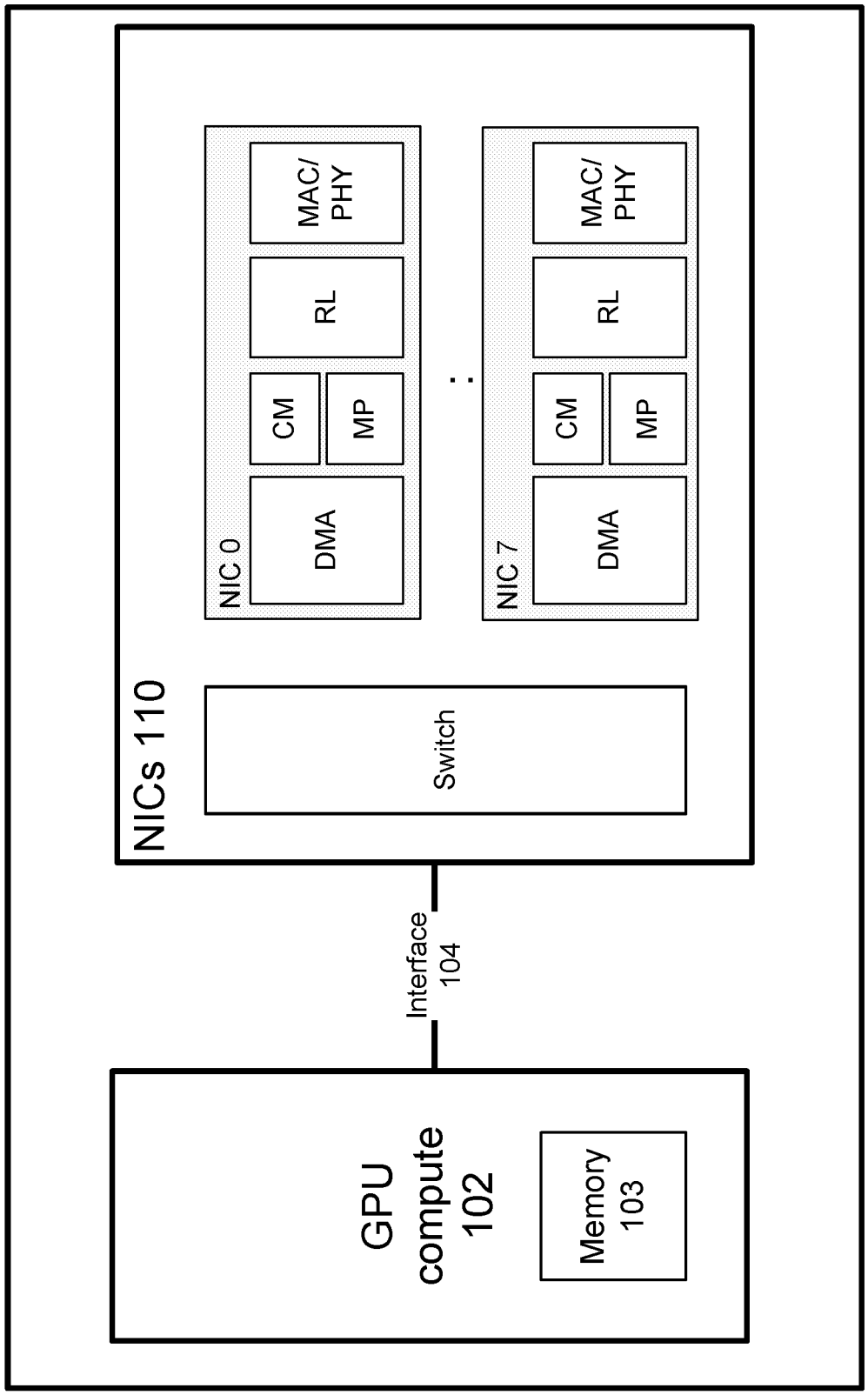
FIG. 1 depicts an example system with GPU and integrated NICs.

At least to provide for communication among GPUs, or other processors or devices (e.g., at least accelerators, FPGAs, application specific integrated circuits (ASICs), CPUs, and so forth), one or more NICs can be integrated into a GPU so that the same semiconductor device or system on chip (SoC) can include a GPU and one or more NICs. A configured smartNIC that communicates in compliance with a CSP's policies for DC network access can be coupled to NICs that are integrated into the GPU or is directly coupled (or assigned to the CPU while connected over an interface or another network device). For example, a GPU NIC can refer to or include at least one NIC that is integrated into a GPU. Note that reference to a CSP can refer in addition, or alternatively to a communication service provider (CoSP). The CSP configured smart NIC can configure one or more NICs integrated into the GPU. For example, a data plane of the one or more integrated NICs can be configured by a CSP controlled smartNIC in one or more of: reliability protocol to apply, packet encryption to apply, packet decryption to apply, network protocol or frame format to utilize, and/or permitted destination for packets.

One or more NICs integrated into the GPU can provide reduced power and performance for high bandwidth and low latency workloads. Capabilities of an integrated NIC can be augmented by a bump-in-the-wire processor accelerator, and/or smartNIC to provide additional features for a CSP or CoSP. One or more integrated NICs may communicate with other NICs based on proprietary protocols or standardized remote direct memory access (RDMA) protocols (e.g., InfiniBand, remote direct memory access (RDMA) over Converged Ethernet (RoCE), RoCEv2, remote memory access (RMA), a specialized proprietary subset of RDMA for its data transfers, and so forth). For example, one or more integrated NICs can be used to provide communication bandwidth for artificial intelligence (AI) training or inference traffic with higher bandwidth, lower latency and other parameters independent from other DC traffic. A GPU can utilize a GPU NIC, NIC coupled through a device interface, or indirectly coupled assigned NIC to communication with another GPU or device. The GPU can access a memory through a NIC via a network.

A CSP or other entity can provide a control plane for a plurality of data planes of one or more NICs of a GPU. One or more smartNICs can be deployed for CSPs to configure one or more GPU NIC data planes. In some examples, the one or more NICs of a GPU provides isolated control plane access to an external CoSP or CSP NIC or smartNIC or other designated management entity so that access can be authenticated to ensure only the appropriate designated management entity can configure and control the GPU NICs. In some examples, the GPU and the local CPU are prevented from accessing, altering, or editing the configuration of the integrated NIC into the GPU or NIC directly attached to the GPU. A CSP programmed control plane can configure data plane(s) of NIC(s) integrated inside the GPU or inside another device (e.g., a switch on a GPU node). An external trusted configuration entity can configure control and configure the CSP programmed control plane. The external trusted configuration entity can be an entity designated by a CSP or CoSP. The external trusted configuration entity can include a software defined networking (SDN) controller, orchestrator, administrator, BMC, container, virtual machine (VM), microservice resident software, or others.

CSP specific control planes can be implemented in one or more trusted network interface devices or smartNICs. For example, for a CSP, a smartNIC can act as a trusted entity and configure a control plane of one or more integrated NICs of the GPU. A CSP controlled control plane device can provide direct link for exclusive programmability of one or more of the GPU integrated data planes (e.g., out-of-band) or by a link shared with data transmission as well (e.g., in-band). In some examples, one or more integrated NICs of the GPU are isolated from the server operating system (OS), hypervisor tenant/user or application and/or from other integrated NICs of the GPU, so that control plane configurations of NICs are separately controlled, thereby providing the CSP with sole capability to control the GPU NICs.

Different CoSPs or CSPs can utilize their own protocols, policies (e.g., congestion, reliability) and can deploy preferred policies. SmartNIC processor core(s) can execute one or more CoSP's or CSP's management software and implement the one or more CoSP's or CSP's security policies. A CoSP or CSP programmed control plane (e.g., software defined networking (SDN)) interacting with a smartNIC can control the integrated data plane NIC (through a dedicated, secure link or virtual link) for network traffic scheduling, injection rate controls, network traffic congestion control, packet receipt reliability, security, memory isolation, etc. CoSP or CSP programmed control plane can participate-in and utilize CoSP or CSP preferred server/network tools (e.g., for inventory, provision, configuration, updates, routing, resource or NICs or tenant workload load balancing, management, telemetry gathering, failure recovery etc.), and/or latency and latency tail control measures.

FIG. 1 depicts an example system with GPU and integrated NICs. In some examples, GPU compute 102 as well as memory 103 can be communicatively coupled to one or more NICs 110. For example, GPU compute 102, memory 103, and NICs 110 can be communicatively coupled using an integrated or externally packaged switch and/or via interface 104 (e.g., Peripheral Component Interconnect express (PCIe), Compute Express Link (CXL), serializer de-serializer (SerDes), silicon photonics or optical interface, or other protocol or connectivity technology). However, an integrated or externally packaged switch can be optional. GPU compute 102, memory 103, and NICs 110 can be formed on a same integrated circuit chip or different integrated circuit chips, same die or different dies, or same package or different packages. GPU compute 102, memory 103, and NICs 110 can be communicatively coupled using chip-to-chip communications, die-to-die communications, packet-based communications, communications over a device interface, fabric-based communications, and so forth. Die-to-die communications can be consistent with Embedded Multi-Die Interconnect Bridge (EMIB), interposer, or other interfaces (e.g., Universal Chiplet Interconnect Express (UCIe), described at least in UCIe 1.0 Specification (2022), as well as earlier versions, later versions, and variations thereof).

GPU compute 102 can include single-instruction multiple thread (SIMT) execution circuitry, one or more tensor cores, a thread dispatcher, or a thread scheduler. GPU compute 102 can include other circuitry and technologies described with respect to FIG. 7A, 7B, 7C, or 7D. In some examples, GPU compute 102 can be virtualized or composable as part of a composite node. Note that reference to GPU can instead refer to an XPU or an accelerator. GPU compute 102 can include or access memory 103 to read or write data. In some examples, memory 103 is in a separate device than that of GPU compute 102.

One or more instances of GPU compute 102 can be disaggregated and located on a same or different servers and provide a composite or composed GPU compute capabilities from the one or more instances of GPU compute via communications technologies such as fabrics, networks, interconnects, device interfaces, and so forth.

NICs 110 can include multiple NICs 0 to 7, although other numbers of NICs can be used. A NIC can include circuitries and technologies described with respect to FIG. 8. For example, a NIC can include direct memory access circuitry and direct memory access (DMA), congestion management (CM), multi-pathing (MP), reliability layer (RL), media access control and physical layer processing (MAC/PHY).

Figure 2:
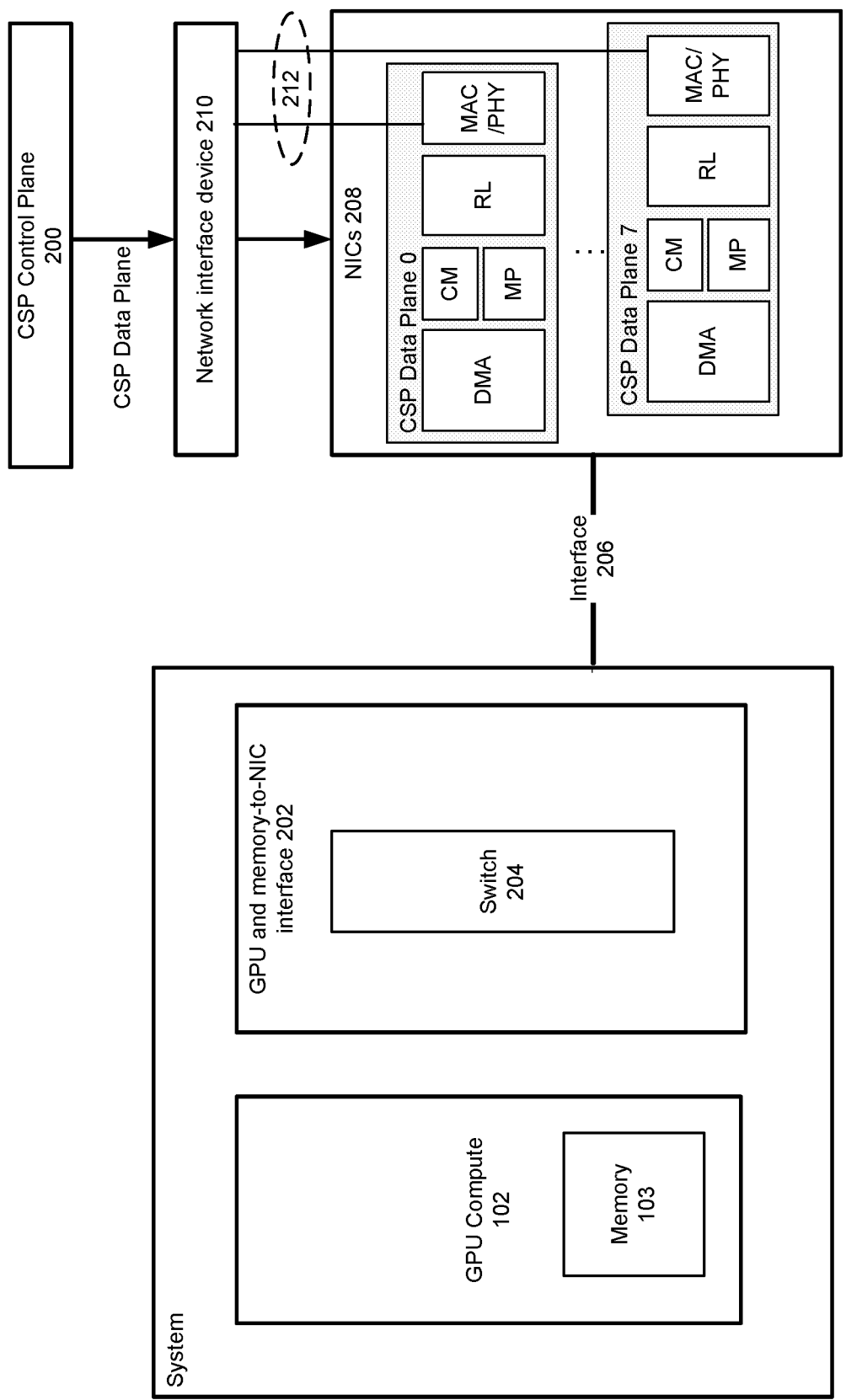
FIG. 2 depicts an example system.

FIG. 2 depicts an example system. GPU compute 102 (or a portion thereof) can utilize one or more NICs of NICs 208 to communicate with other devices. NICs 208 can be integrated into silicon of GPU compute 102, in a same GPU package, or in a connectivity device such a switch, potentially serving one or more GPUs or a portion of GPU compute 102. In some examples, optionally, switch 204 can utilized to provide communications between GPU compute 102 or memory 103 and one or more NIC via connection 202 and interface 206. Interface 206 can utilize one or more of the following standards and technology: Peripheral Component Interconnect express (PCIe), Compute Express Link (CXL), serializer de-serializer (SerDes), silicon photonics or optical interface, or other protocol or connectivity technology. GPU compute 102, connection 202, and NICs 208 can be formed on a same integrated circuit chip or different integrated circuit chips, same die or different dies, or same package or different packages.

In some examples, data planes of one or more of NICs 0-7 can be configured by one or more different CoSPs or CSPs. CSP control plane 200 can provide configuration of one or more CSP data planes of one or more of NICs 0-7 via network interface device 210. In some examples, network interface device 210 can include one or more of: a network interface controller (NIC), a remote direct memory access (RDMA)-enabled NIC, SmartNIC, router, switch, forwarding element, infrastructure processing unit (IPU), or data processing unit (DPU). In some examples, network interface device 210 and NICs 208 can communicate out-of-band over designated management interfaces (e.g., PCIe, baseboard management controller (BMC), over Distributed Management Task Force (DMTF) protocols, etc.). In some examples, network interface device 210 and NICs 208 can communicate in-band over one or more links 212 used for data transmission.

CSP control plane 200 can configure network interface device 210 to configure data planes of one or more of NICs among NICs 208 in one or more of: reliability layer, security (e.g., encryption/decryption schemes to apply), network protocol and/or frame format options to apply. Control of the data plane can be exclusive and may not, in some examples, be changed by GPU compute 102, software executed by GPU 102, or CPU executed host software. Data plane programming can include selection and/or configuration of one or more of: congestion management (CM) to apply (e.g., Swift, Data Center Quantized Congestion Notification (DCQCN), Explicit Congestion Notification (ECN), Priority-based Flow Control (PFC), Data Center TCP (DCTCP), Timely, and so forth), or allow for one or more CSP-specific CM algorithms. Data plane programming can also allow for programming of the reliability layer (RL) to provide transport services (e.g., guaranteed packet delivery, in-order packet delivery, packet drop identification and/or packet duplication avoidance) and packet transport and packet re-transmission similar to services provided by TCP, UDP, or other reliability protocols. Data plane programming can also allow for programming of the multi pathing protocol (MP) to select a manner of utilizing available multiple routes or paths between sender and a receiver. Data plane programming can also allow for programming of a protocol to utilize for packet transmissions or receipt (e.g., RoCE, Scalable Reliable Datagram (SRD), QUIC), and so forth. For example, CSP control plane 200 can be implemented as an SDN controller that is executed on a same or different server than that of GPU compute 102. Connectivity between CSP control plane 200 and switch 204 can occur based on packet based communications in accordance with standardized or proprietary protocols. For example, the SDN controller can be consistent with one or more of: Data Plane Development Kit (DPDK), OpenDataPlane (ODP), Infrastructure Programmer Development Kit (IPDK).

Figure 3:
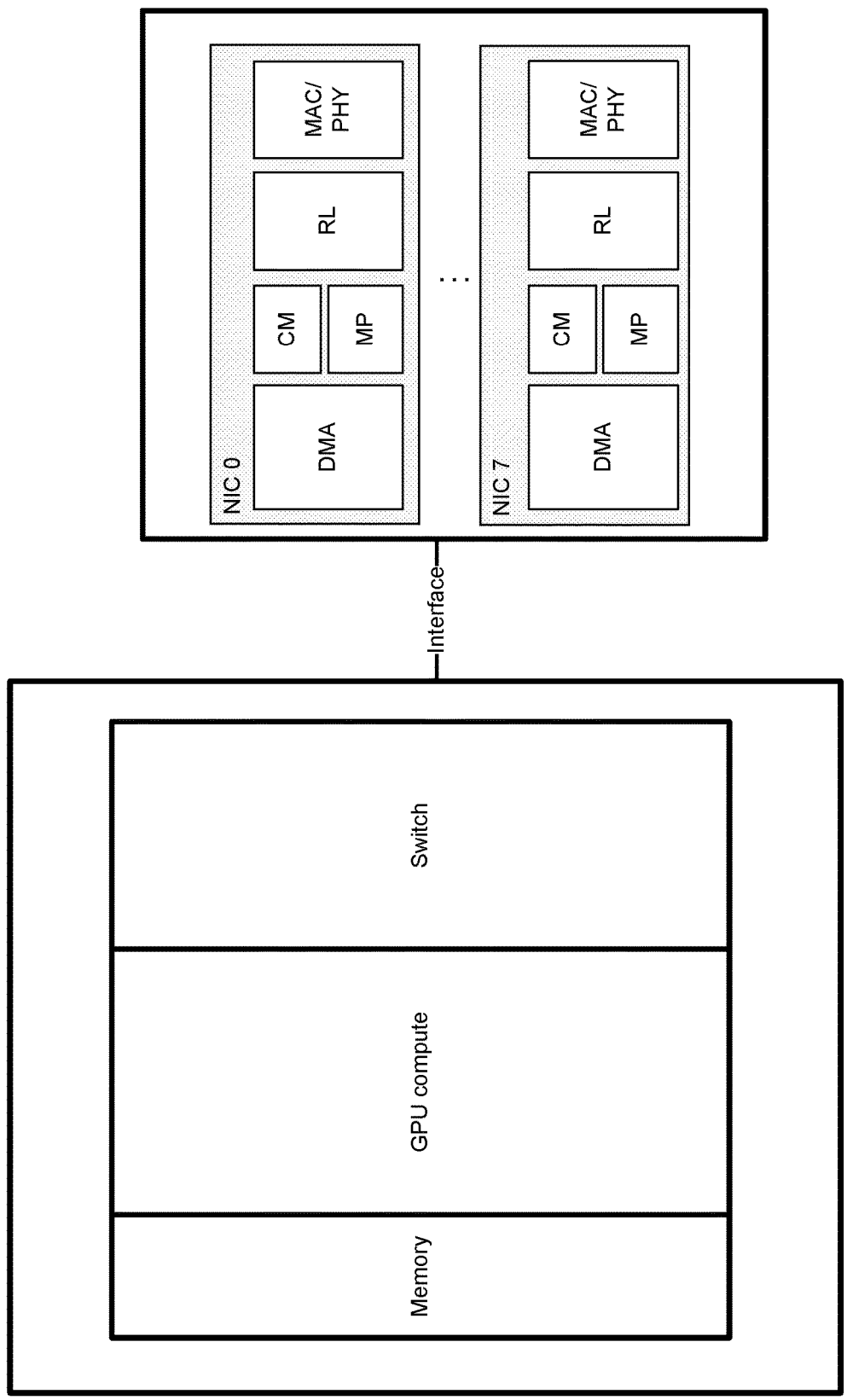
FIG. 3 depicts an example system.

FIG. 3 depicts an example system. Data in memory can be provided to a Network Interface. In some embodiments, one or more NICs can be coupled via a high speed interface to a switch that is on-circuit board with a GPU. Interface can include a silicon photonics or optical link, or other technology. Switch can be optionally utilized in some examples.

Figure 4:
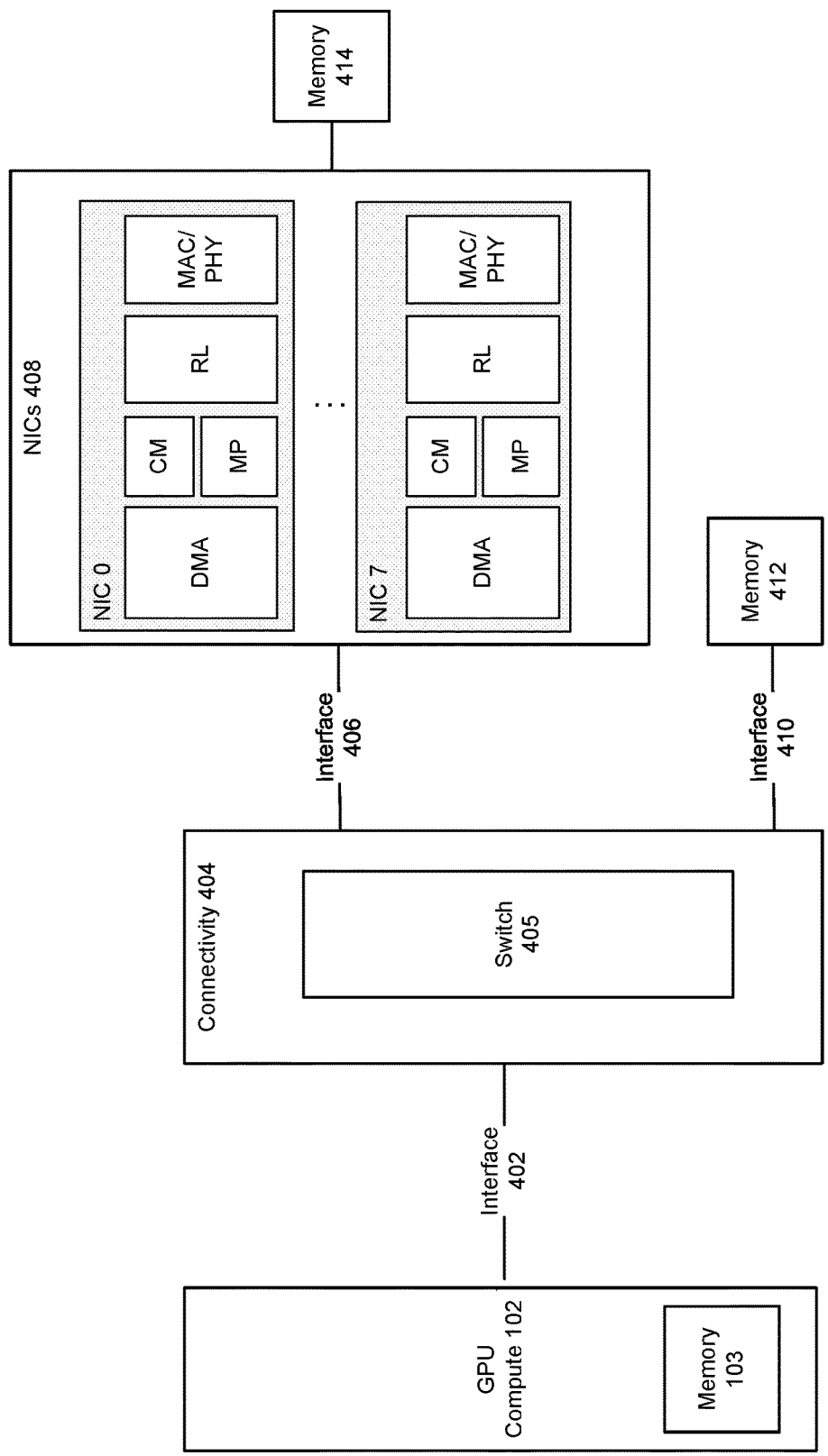
FIG. 4 depicts an example system.

FIG. 4 depicts an example system. In some examples, externally packaged NICs 408 can be coupled via a high speed interface 406 to switch 405 of connectivity 404. In some examples, NICs 408 can be provided by a different manufacturer than that which manufactured GPU compute 102. Switch 405 can be coupled to GPU compute 102 using a interface 402. Interface 402 can include serial or parallel interfaces. Connectivity 404 can be communicatively coupled with NIC 408 using interface 406. GPU compute 102 can be provided in a semiconductor package with interfaces 402, connectivity 404 can be provided in a separate die than that of GPU compute 102. Note that switch 405 can provide communication among GPU compute 102, memory, 103, and a memory device or memory pool of external memory (e.g., dual inline memory modules (DIMMs) 412 via interface 410. Interface 402, interface 406, and/or interface 410 can utilize one or more of the following standards and technology: Peripheral Component Interconnect express (PCIe), Compute Express Link (CXL), serializer de-serializer (SerDes), silicon photonics or optical interface, or other protocol or connectivity technology.

Connectivity 404 can be provided in a same or different circuit board than that of GPU compute 102. Connectivity 404 can be provided in a same or different package than that of GPU compute 102. A package can include metal, plastic, glass, or ceramic casing that includes one or more semiconductor devices or integrated circuits. In some examples, NICs 408 can be provided on a same circuit board or different circuit board than that of GPU compute 102. In some examples, NICs 408 can be provided on a same circuit board or different circuit board than that of connectivity 404. In some examples, NICs 408 can be provided in a same or different semiconductor package than that of connectivity 404. In some examples, NICs 408 can be provided in a same or different semiconductor package than that of GPU compute 102. In some examples, NICs 408 can be provided in a same or different semiconductor package than that of GPU compute 102 and connectivity 404. NICs 408 can provide communication among GPU compute 102, memory 103, memory 412, and memory 414, that may be accessible over the network or some interface. In some examples, memory 414 can be implemented as a memory pool of one or more DIMMs.

Figure 5:
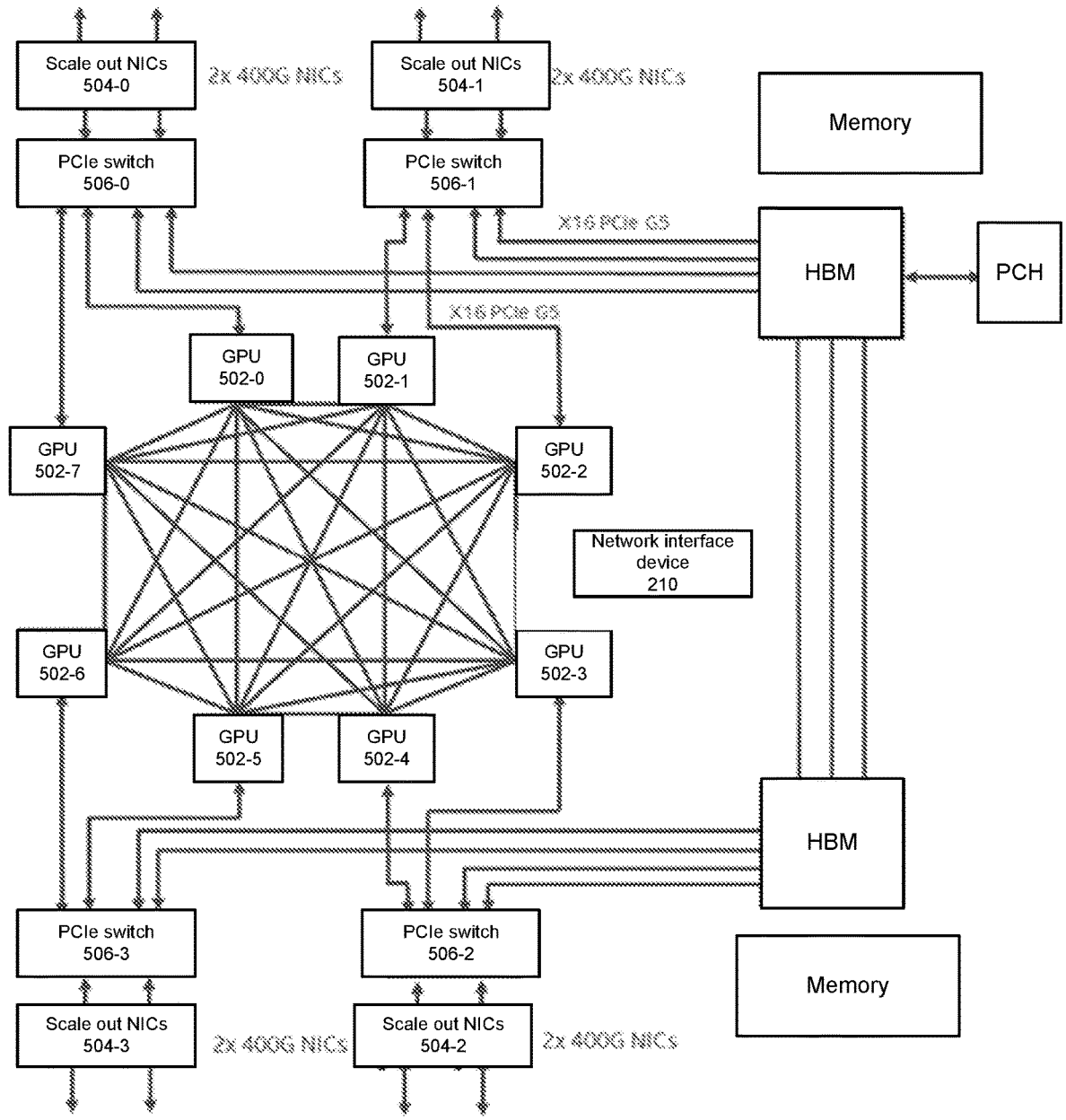
FIG. 5 depicts an example of a GPU server.

FIG. 5 depicts an example of a GPU server. In some examples, scale out NICs 504-0 to 504-3 interface with GPU 502-0 to 502-7 via one or more PCIe switches 506-0 to 506-3. Scale up NICs can be integrated into GPUs 502-0 to 502-7, as described herein, to provide connectivity to on-circuit board GPUs. The scale out NICs can provide capability for a proprietary training cluster case and can be solely configured by CSPs, in accordance with the examples above. In some examples, the integrated NICs can be utilized for a GPU to communicate with other on-node devices (e.g., GPUs, memory, accelerators, and so forth) such as for scale-up connectivity, inter-node connectivity, or scale-out connectivity to communicate with other devices, whether the GPU and other devices are integrated into a same semiconductor device or different semiconductor devices. Integrated NICs can be controlled and configured by as CSP management entity via an interface to the CSP DC directly, or through another network interface device (e.g., a switch) or a network interface device (e.g., network interface device 210).

Figure 6:
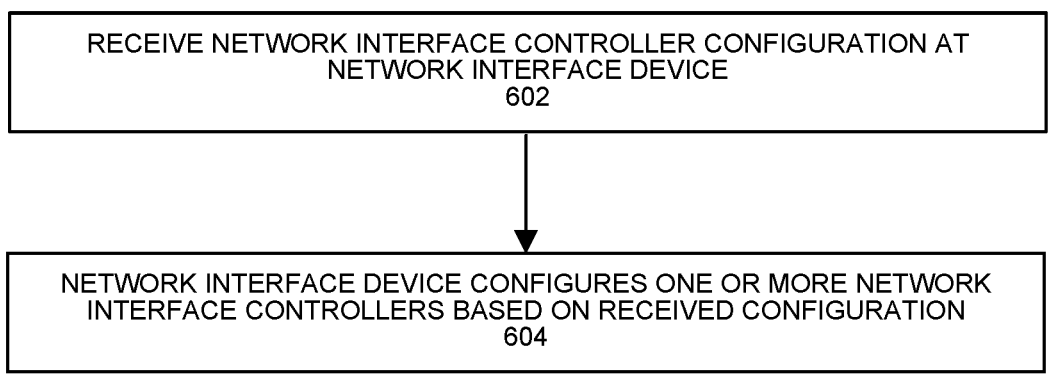
FIG. 6 depicts an example process.

FIG. 6 depicts an example process. The process can be performed by a system with a GPU with one or more integrated or connected NICs for GPU-to-GPU connectivity. At 602, a configuration of one or more NICs can be received. The configuration can be received from a CSP control plane software. The configuration can be received at a network interface device such as a smartNIC. In some examples, the configuration can specify one or more of: reliability protocol to apply, packet encryption to apply, packet decryption to apply, network protocol or frame format to utilize, and/or permitted destination for packets. At 604, the one or more integrated or connected NICs can be configured by the configuration. For example, the data plane can be configured by the network interface device using the configuration. In some examples, the configuration is written in Protocol-independent Packet Processors (P4), although other formats can be utilized.

Figure 7A:
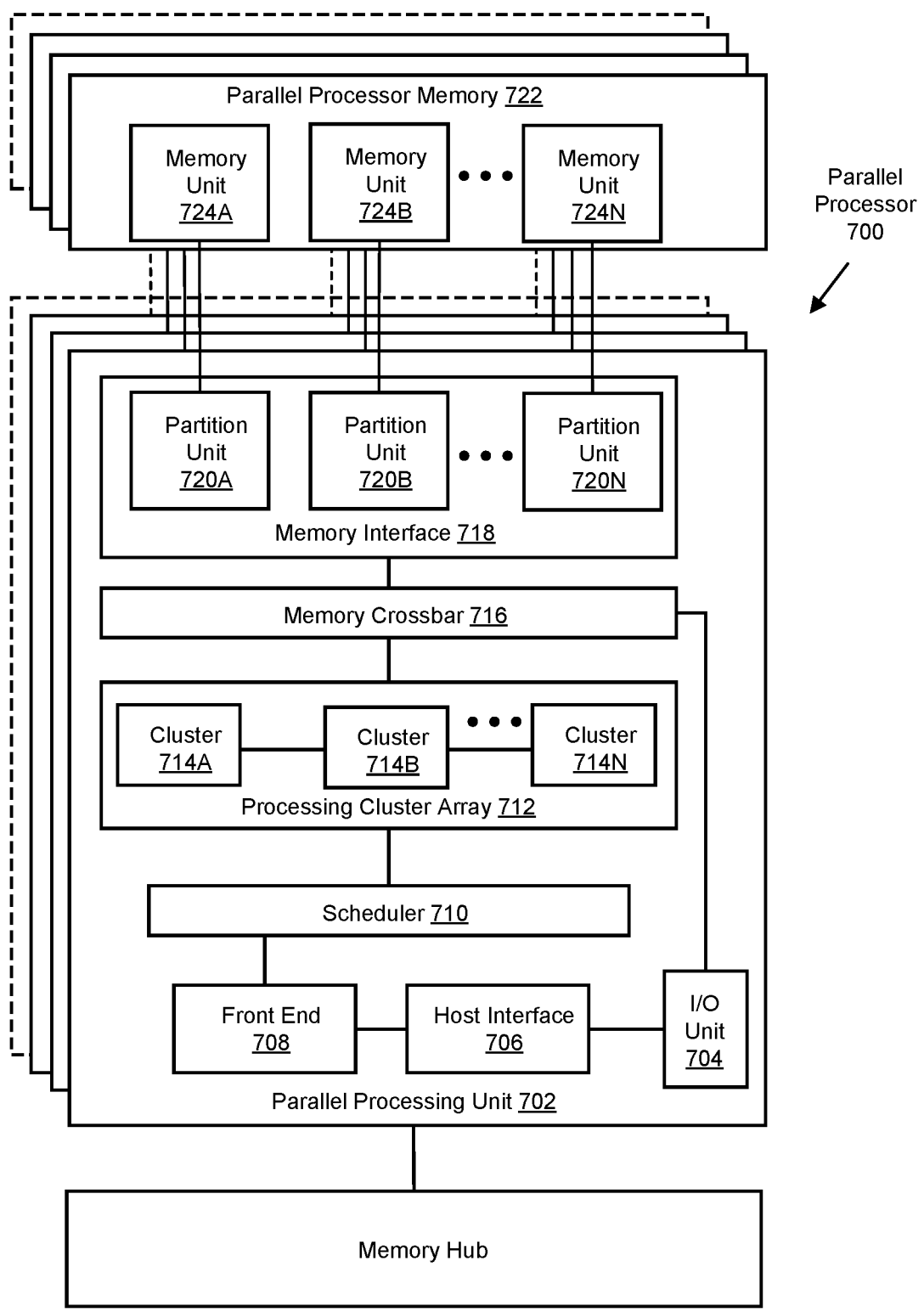
FIGS. 7A-7D depict an example GPU.

FIGS. 7A-7D depict example GPU compute components. FIG. 7A illustrates a parallel processor 700. The parallel processor 700 may be a GPU, GPGPU or the like as described herein. The various components of the parallel processor 700 may be implemented using one or more integrated circuit devices, such as programmable processors, application specific integrated circuits (ASICs), or field programmable gate arrays (FPGA).

The parallel processor 700 includes a parallel processing unit 702. The parallel processing unit includes an I/O unit 704 that enables communication with other devices, including other instances of the parallel processing unit 702. The I/O unit 704 may be directly connected to other devices. For instance, the I/O unit 704 connects with other devices via the use of a hub or switch interface, such as a memory hub. The connections between the memory hub 75 and the I/O unit 704 form a communication link. Within the parallel processing unit 702, the I/O unit 704 connects with a host interface 706 and a memory crossbar 716, where the host interface 706 receives commands directed to performing processing operations and the memory crossbar 716 receives commands directed to performing memory operations.

When the host interface 706 receives a command buffer via the I/O unit 704, the host interface 706 can direct work operations to perform those commands to a front end 708. In one embodiment the front end 708 couples with a scheduler 710, which is configured to distribute commands or other work items to a processing cluster array 712. The scheduler 710 configures processing cluster array 712 is properly configured and in a valid state before tasks are distributed to the processing clusters of the processing cluster array 712. The scheduler 710 may be implemented via firmware logic executing on a microcontroller. The microcontroller implemented scheduler 710 is configurable to perform complex scheduling and work distribution operations at coarse and fine granularity, enabling rapid preemption and context switching of threads executing on the processing cluster array 712. Preferably, the host software can prove workloads for scheduling on the processing cluster array 712 via one of multiple graphics processing doorbells. In other examples, polling for new workloads or interrupts can be used to identify or indicate availability of work to perform. The workloads can then be automatically distributed across the processing cluster array 712 by the scheduler 710 logic within the scheduler microcontroller.

The processing cluster array 712 can include up to "N" processing clusters (e.g., cluster 714A, cluster 714B, through cluster 714N). At least one of cluster 714A-714N of the processing cluster array 712 can execute a large number of concurrent threads. The scheduler 710 can allocate work to the clusters 714A-714N of the processing cluster array 712 using various scheduling and/or work distribution algorithms, which may vary depending on the workload arising for a type of program or computation. The scheduling can be handled dynamically by the scheduler 710 or can be assisted in part by compiler logic during compilation of program logic configured for execution by the processing cluster array 712. Optionally, different clusters 714A-714N of the processing cluster array 712 can be allocated for processing different types of programs or for performing different types of computations.

The processing cluster array 712 can be configured to perform various types of parallel processing operations. For example, the processing cluster array 712 is configured to perform general-purpose parallel compute operations. For example, the processing cluster array 712 can include logic to execute processing tasks including filtering of video and/or audio data, performing modeling operations, including physics operations, and performing data transformations.

The processing cluster array 712 is configured to perform parallel graphics processing operations. In such embodiments in which the parallel processor 700 is configured to perform graphics processing operations, the processing cluster array 712 can include additional logic to support the execution of such graphics processing operations, including, but not limited to texture sampling logic to perform texture operations, as well as tessellation logic and other vertex processing logic. Additionally, the processing cluster array 712 can be configured to execute graphics processing related shader programs such as, but not limited to vertex shaders, tessellation shaders, geometry shaders, and pixel shaders. The parallel processing unit 702 can transfer data from system memory via the I/O unit 704 for processing. During processing the transferred data can be stored to on-chip memory (e.g., parallel processor memory 722) during processing, then written back to system memory.

In embodiments in which the parallel processing unit 702 is used to perform graphics processing, the scheduler 710 may be configured to divide the processing workload into approximately equal sized tasks, to better enable distribution of the graphics processing operations to multiple clusters 714A-714N of the processing cluster array 712. In some of these embodiments, portions of the processing cluster array 712 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 714A-714N may be stored in buffers to allow the intermediate data to be transmitted between clusters 714A-714N for further processing.

During operation, the processing cluster array 712 can receive processing tasks to be executed via the scheduler 710, which receives commands defining processing tasks from front end 708. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 710 may be configured to fetch the indices corresponding to the tasks or may receive the indices from the front end 708. The front end 708 can configure the processing cluster array 712 to a valid state before the workload specified by incoming command buffers (e.g., batch-buffers, push buffers, etc.) is initiated.

At least one of the one or more instances of the parallel processing unit 702 can couple with parallel processor memory 722. The parallel processor memory 722 can be accessed via the memory crossbar 716, which can receive memory requests from the processing cluster array 712 as well as the I/O unit 704. The memory crossbar 716 can access the parallel processor memory 722 via a memory interface 718. The memory interface 718 can include multiple partition units (e.g., partition unit 720A, partition unit 720B, through partition unit 720N) that can couple to a portion (e.g., memory unit) of parallel processor memory 722. The number of partition units 720A-720N may be configured to be equal to the number of memory units, such that a first partition unit 720A has a corresponding first memory unit 724A, a second partition unit 720B has a corresponding second memory unit 724B, and an Nth partition unit 720N has a corresponding Nth memory unit 724N. In other embodiments, the number of partition units 720A-720N may not be equal to the number of memory devices.

The memory units 724A-724N can include various types of memory devices, including dynamic random-access memory (DRAM) or graphics random access memory, such as synchronous graphics random access memory (SGRAM), including graphics double data rate (GDDR) memory. Optionally, the memory units 724A-724N may also include 3D stacked memory, including but not limited to high bandwidth memory (HBM). Persons skilled in the art will appreciate that the specific implementation of the memory units 724A-724N can vary and can be selected from one of various conventional designs. Render targets, such as frame buffers or texture maps may be stored across the memory units 724A-724N, allowing partition units 720A-720N to write portions of a render target in parallel to efficiently use the available bandwidth of parallel processor memory 722. In some embodiments, a local instance of the parallel processor memory 722 may be excluded in favor of a unified memory design that utilizes system memory in conjunction with local cache memory.

Optionally, any one of the clusters 714A-714N of the processing cluster array 712 has the ability to process data that will be written to any of the memory units 724A-724N within parallel processor memory 722. The memory crossbar 716 can be configured to transfer the output of at least one of cluster 714A-714N to any partition unit 720A-720N or to another cluster 714A-714N, which can perform additional processing operations on the output. At least one of cluster 714A-714N can communicate with the memory interface 718 through the memory crossbar 716 to read from or write to various external memory devices. In one of the embodiments with the memory crossbar 716 the memory crossbar 716 has a connection to the memory interface 718 to communicate with the I/O unit 704, as well as a connection to a local instance of the parallel processor memory 722, enabling the processing units within the different processing clusters 714A-714N to communicate with system memory or other memory that is not local to the parallel processing unit 702. Generally, the memory crossbar 716 may, for example, be able to use virtual channels to separate traffic streams between the clusters 714A-714N and the partition units 720A-720N.

While a single instance of the parallel processing unit 702 is illustrated within the parallel processor 700, any number of instances of the parallel processing unit 702 can be included. For example, multiple instances of the parallel processing unit 702 can be provided on a single add-in card, or multiple add-in cards can be interconnected. For example, the parallel processor 700 can be an add-in device, which may be a graphics card such as a discrete graphics card that includes one or more GPUs, one or more memory devices, and device-to-device or network or fabric interfaces. The different instances of the parallel processing unit 702 can be configured to inter-operate even if the different instances have different numbers of processing cores, different amounts of local parallel processor memory, and/or other configuration differences. Optionally, some instances of the parallel processing unit 702 can include higher precision floating point units relative to other instances. Systems incorporating one or more instances of the parallel processing unit 702 or the parallel processor 700 can be implemented in a variety of configurations and form factors, including but not limited to desktop, laptop, or handheld personal computers, servers, workstations, game consoles, and/or embedded systems. An orchestrator can form composite nodes for workload performance using one or more of: disaggregated processor resources, cache resources, memory resources, storage resources, and networking resources.

Figure 7B:
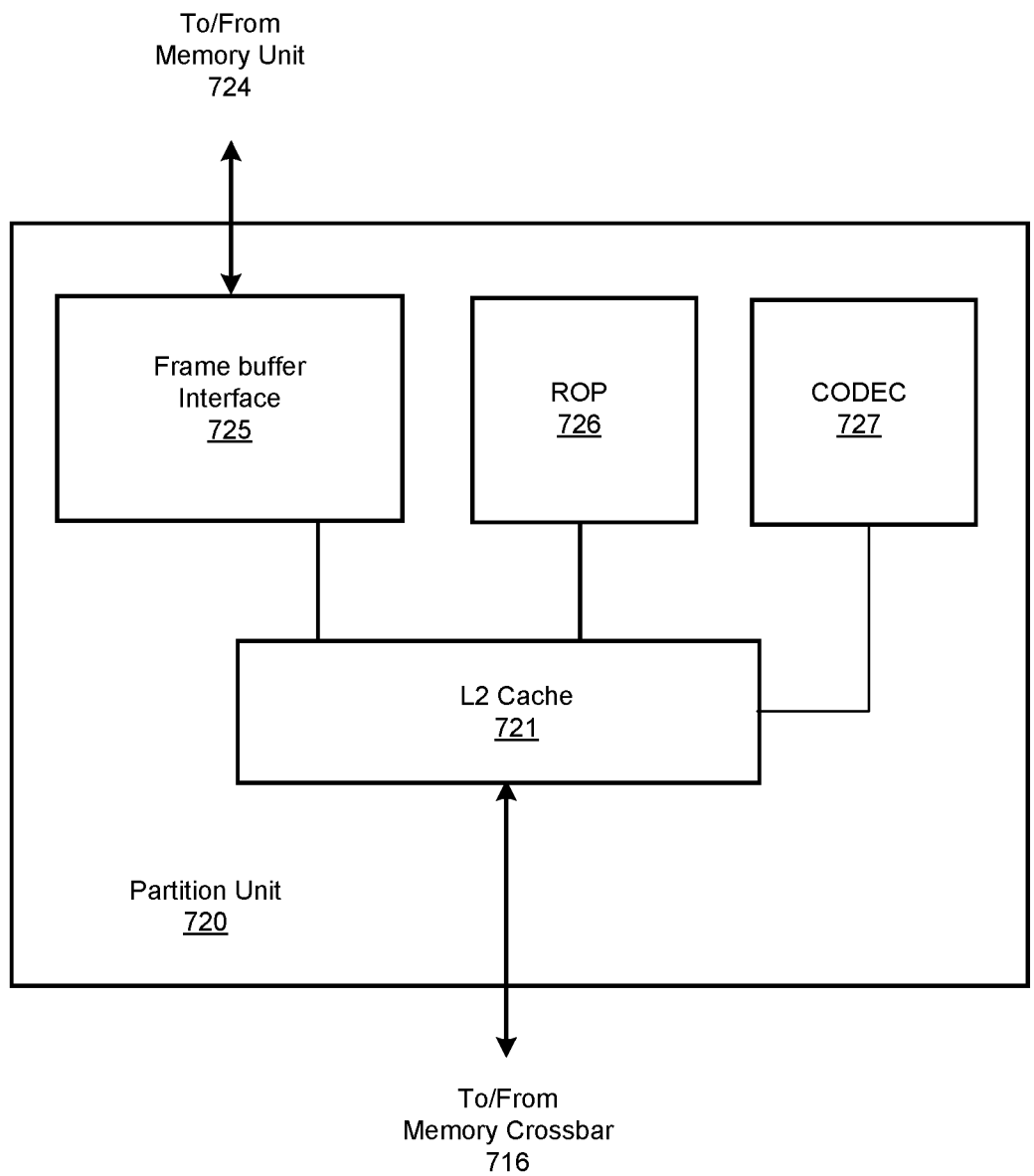

FIG. 7B is a block diagram of a partition unit 720. The partition unit 720 may be an instance of one of the partition units 720A-720N of FIG. 7A. As illustrated, the partition unit 720 includes an L2 cache 721, a frame buffer interface 725, and a ROP 726 (raster operations unit). The L2 cache 721 is a read/write cache that is configured to perform load and store operations received from the memory crossbar 716 and ROP 726. Read misses and urgent write-back requests are output by L2 cache 721 to frame buffer interface 725 for processing. Updates can also be sent to the frame buffer via the frame buffer interface 725 for processing. In one embodiment the frame buffer interface 725 interfaces with one of the memory units in parallel processor memory, such as the memory units 724A-724N of FIG. 7A (e.g., within parallel processor memory 722). The partition unit 720 may additionally or alternatively also interface with one of the memory units in parallel processor memory via a memory controller (not shown).

In graphics applications, the ROP 726 is a processing unit that performs raster operations such as stencil, z test, blending, and the like. The ROP 726 then outputs processed graphics data that is stored in graphics memory. In some embodiments the ROP 726 includes or couples with a CODEC 727 that includes compression logic to compress depth or color data that is written to memory or the L2 cache 721 and decompress depth or color data that is read from memory or the L2 cache 721. The compression logic can be lossless compression logic that makes use of one or more of multiple compression algorithms. The type of compression that is performed by the CODEC 727 can vary based on the statistical characteristics of the data to be compressed. For example, in one embodiment, delta color compression is performed on depth and color data on a per-tile basis. In one embodiment the CODEC 727 includes compression and decompression logic that can compress and decompress compute data associated with machine learning operations. The CODEC 727 can, for example, compress sparse matrix data for sparse machine learning operations. The CODEC 727 can also compress sparse matrix data that is encoded in a sparse matrix format (e.g., coordinate list encoding (COO), compressed sparse row (CSR), compress sparse column (CSC), etc.) to generate compressed and encoded sparse matrix data. The compressed and encoded sparse matrix data can be decompressed and/or decoded before being processed by processing elements or the processing elements can be configured to consume compressed, encoded, or compressed and encoded data for processing.

The ROP 726 may be included within at least one processing cluster (e.g., cluster 714A-714N of FIG. 7A) instead of within the partition unit 720. In such embodiment, read and write requests for pixel data are transmitted over the memory crossbar 716 instead of pixel fragment data. The processed graphics data may be displayed on a display device, such as one of the one or more display device(s), routed for further processing by processor(s), or routed for further processing by one of the processing entities within a parallel processor 700.

Figure 7C:
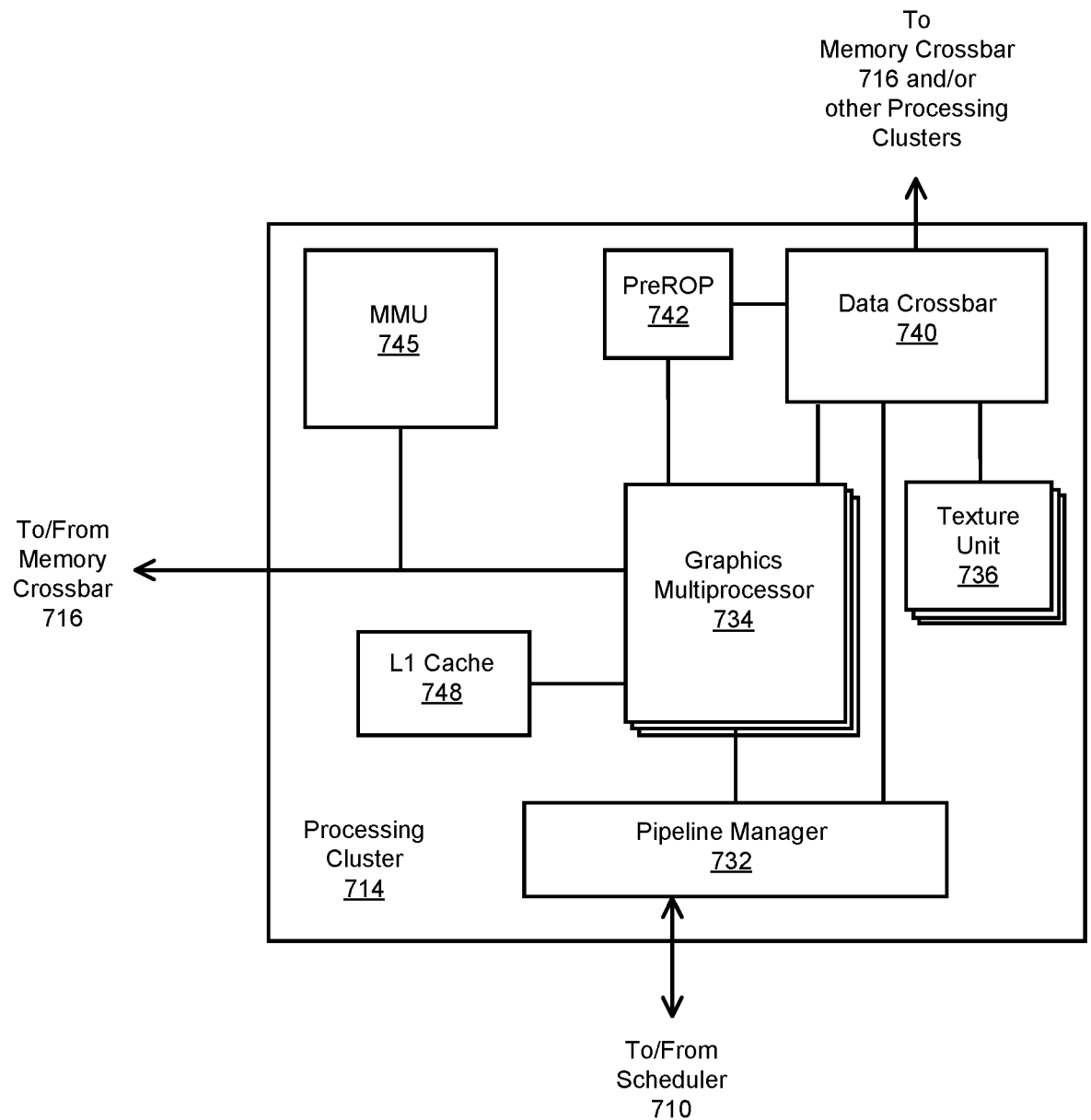

FIG. 7C is a block diagram of a processing cluster 714 within a parallel processing unit. For example, the processing cluster is an instance of one of the processing clusters 714A-714N of FIG. 7A. The processing cluster 714 can be configured to execute many threads in parallel, where the term "thread" refers to an instance of a particular program executing on a particular set of input data. Optionally, single-instruction, multiple-data (SIMD) instruction issue techniques may be used to support parallel execution of a large number of threads without providing multiple independent instruction units. Alternatively, single-instruction, multiple-thread (SIMT) techniques may be used to support parallel execution of a large number of generally synchronized threads, using a common instruction unit configured to issue instructions to a set of processing engines within at least one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 714 can be controlled via a pipeline manager 732 that distributes processing tasks to SIMT parallel processors. The pipeline manager 732 receives instructions from the scheduler 710 of FIG. 7A and manages execution of those instructions via a graphics multiprocessor 734 and/or a texture unit 736. The illustrated graphics multiprocessor 734 is an exemplary instance of a SIMT parallel processor. However, various types of SIMT parallel processors of differing architectures may be included within the processing cluster 714. One or more instances of the graphics multiprocessor 734 can be included within a processing cluster 714. The graphics multiprocessor 734 can process data and a data crossbar 740 can be used to distribute the processed data to one of multiple possible destinations, including other shader units. The pipeline manager 732 can facilitate the distribution of processed data by specifying destinations for processed data to be distributed via the data crossbar 740.

At least one of graphics multiprocessor 734 within the processing cluster 714 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison operations, Boolean operations, bit-shifting, and computation of various algebraic functions. The same functional-unit hardware could be leveraged to perform different operations and any combination of functional units may be present.

The instructions transmitted to the processing cluster 714 constitute a thread. A set of threads executing across the set of parallel processing engines is a thread group. A thread group executes the same program on different input data. At least one thread within a thread group can be assigned to a different processing engine within a graphics multiprocessor 734. A thread group may include fewer threads than the number of processing engines within the graphics multiprocessor 734. When a thread group includes fewer threads than the number of processing engines, one or more of the processing engines may be idle during cycles in which that thread group is being processed. A thread group may also include more threads than the number of processing engines within the graphics multiprocessor 734. When the thread group includes more threads than the number of processing engines within the graphics multiprocessor 734, processing can be performed over consecutive clock cycles. Optionally, multiple thread groups can be executed concurrently on the graphics multiprocessor 734.

The graphics multiprocessor 734 may include an internal cache memory to perform load and store operations. Optionally, the graphics multiprocessor 734 can forego an internal cache and use a cache memory (e.g., level 1 (L1) cache 748) within the processing cluster 714. At least one graphics multiprocessor 734 also has access to level 2 (L2) caches within the partition units (e.g., partition units 720A-720N of FIG. 7A) that are shared among all processing clusters 714 and may be used to transfer data between threads. The graphics multiprocessor 734 may also access off-chip global memory, which can include one or more of local parallel processor memory and/or system memory. Any memory external to the parallel processing unit 702 may be used as global memory. Embodiments in which the processing cluster 714 includes multiple instances of the graphics multiprocessor 734 can share common instructions and data, which may be stored in the L1 cache 748.

At least one processing cluster 714 may include an MMU 745 (memory management unit) that is configured to map virtual addresses into physical addresses. In other embodiments, one or more instances of the MMU 745 may reside within the memory interface 718 of FIG. 7A. The MMU 745 includes a set of page table entries (PTEs) used to map a virtual address to a physical address of a tile and optionally a cache line index. The MMU 745 may include address translation lookaside buffers (TLB) or caches that may reside within the graphics multiprocessor 734 or the L1 cache 748 of processing cluster 714. The physical address is processed to distribute surface data access locality to allow efficient request interleaving among partition units. The cache line index may be used to determine whether a request for a cache line is a hit or miss.

In graphics and computing applications, a processing cluster 714 may be configured such that at least one graphics multiprocessor 734 is coupled to a texture unit 736 for performing texture mapping operations, e.g., determining texture sample positions, reading texture data, and filtering the texture data. Texture data is read from an internal texture L1 cache (not shown) or in some embodiments from the L1 cache within graphics multiprocessor 734 and is fetched from an L2 cache, local parallel processor memory, or system memory, as needed. At least one graphics multiprocessor 734 outputs processed tasks to the data crossbar 740 to provide the processed task to another processing cluster 714 for further processing or to store the processed task in an L2 cache, local parallel processor memory, or system memory via the memory crossbar 716. A preROP 742 (pre-raster operations unit) is configured to receive data from graphics multiprocessor 734, direct data to ROP units, which may be located with partition units as described herein (e.g., partition units 720A-720N of FIG. 7A). The preROP 742 unit can perform optimizations for color blending, organize pixel color data, and perform address translations.

It will be appreciated that the core architecture described herein is illustrative and that variations and modifications are possible. Any number of processing units, e.g., graphics multiprocessor 734, texture units 736, preROPs 742, etc., may be included within a processing cluster 714. Further, while only one processing cluster 714 is shown, a parallel processing unit as described herein may include any number of instances of the processing cluster 714. Optionally, at least one processing cluster 714 can be configured to operate independently of other processing clusters 714 using separate and distinct processing units, L1 caches, L2 caches, etc.

Figure 7D:
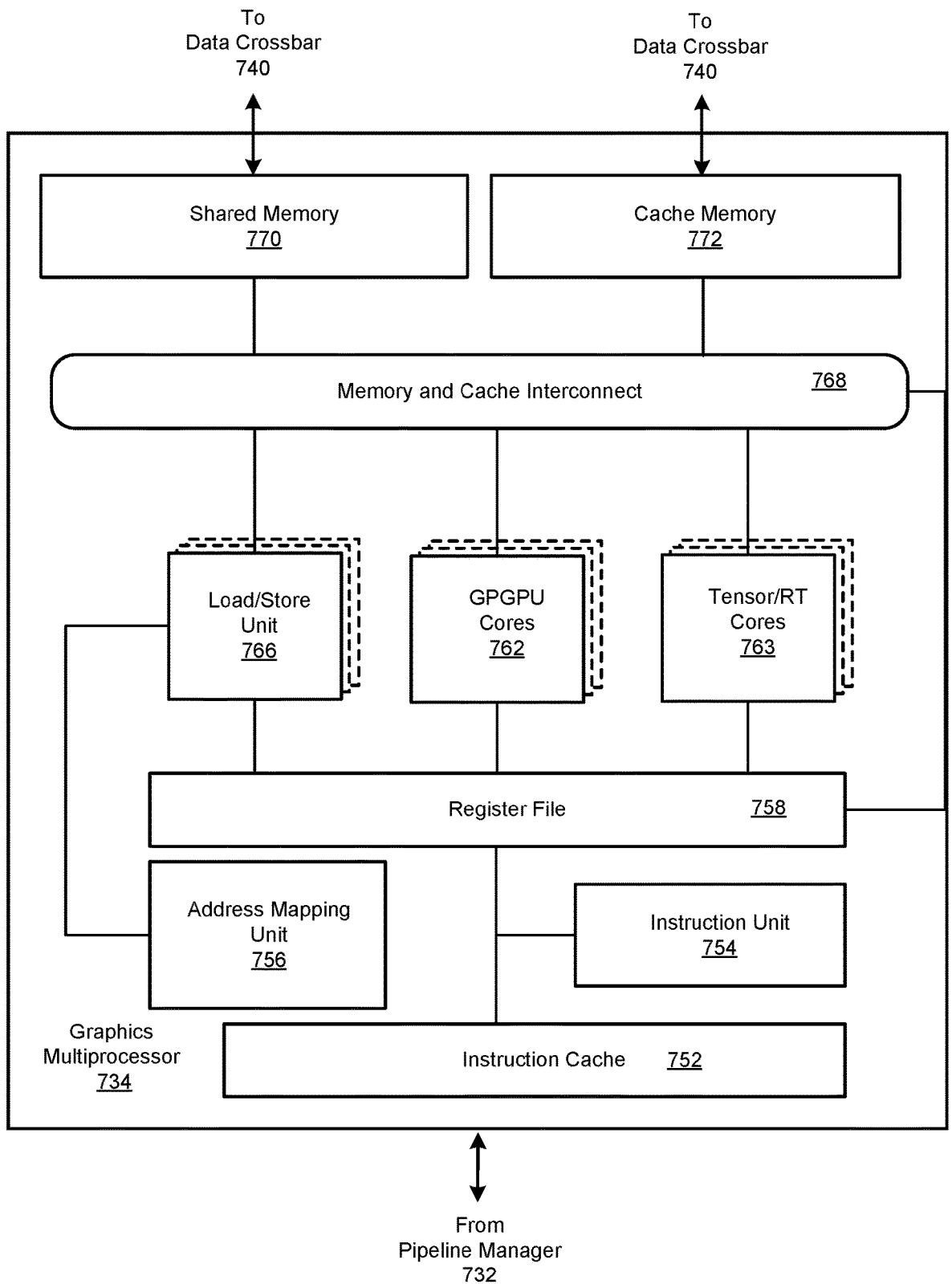

FIG. 7D shows an example of the graphics multiprocessor 734 in which the graphics multiprocessor 734 couples with the pipeline manager 732 of the processing cluster 714. The graphics multiprocessor 734 has an execution pipeline including but not limited to an instruction cache 752, an instruction unit 754, an address mapping unit 756, a register file 758, one or more general purpose graphics processing unit (GPGPU) cores 762, and one or more load/store units 766. The GPGPU cores 762 and load/store units 766 are coupled with cache memory 772 and shared memory 770 via a memory and cache interconnect 768. The graphics multiprocessor 734 may additionally include tensor and/or ray-tracing cores 763 that include hardware logic to accelerate matrix and/or ray-tracing operations.

The instruction cache 752 may receive a stream of instructions to execute from the pipeline manager 732. The instructions are cached in the instruction cache 752 and dispatched for execution by the instruction unit 754. The instruction unit 754 can dispatch instructions as thread groups (e.g., warps), with at least one thread of the thread group assigned to a different execution unit within GPGPU core 762. An instruction can access a local, shared, or global address space by specifying an address within a unified address space. The address mapping unit 756 can be used to translate addresses in the unified address space into a distinct memory address that can be accessed by the load/store units 766.

The register file 758 provides a set of registers for the functional units of the graphics multiprocessor 734. The register file 758 provides temporary storage for operands connected to the data paths of the functional units (e.g., GPGPU cores 762, load/store units 766) of the graphics multiprocessor 734. The register file 758 may be divided between at least one of the functional units such that at least one functional unit is allocated a dedicated portion of the register file 758. For example, the register file 758 may be divided between the different warps being executed by the graphics multiprocessor 734.

The GPGPU cores 762 can include floating point units (FPUs) and/or integer arithmetic logic units (ALUs) that are used to execute instructions of the graphics multiprocessor 734. In some implementations, the GPGPU cores 762 can include hardware logic that may otherwise reside within the tensor and/or ray-tracing cores 763. The GPGPU cores 762 can be similar in architecture or can differ in architecture.

For example and in one embodiment, a first portion of the GPGPU cores 762 include a single precision FPU and an integer ALU while a second portion of the GPGPU cores include a double precision FPU. Optionally, the FPUs can implement the IEEE 754-2008 standard for floating point arithmetic or enable variable precision floating point arithmetic. The graphics multiprocessor 734 can additionally include one or more fixed function or special function units to perform specific functions such as copy rectangle or pixel blending operations. One or more of the GPGPU cores can also include fixed or special function logic.

The GPGPU cores 762 may include SIMD logic capable of performing a single instruction on multiple sets of data. Optionally, GPGPU cores 762 can physically execute SIMD4, SIMD8, and SIMD16 instructions and logically execute SIMD1, SIMD2, and SIMD3 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can be executed via a single SIMD instruction. For example and in one embodiment, eight SIMT threads that perform the same or similar operations can be executed in parallel via a single SIMD8 logic unit.

The memory and cache interconnect 768 is an interconnect network that connects at least one of the functional units of the graphics multiprocessor 734 to the register file 758 and to the shared memory 770. For example, the memory and cache interconnect 768 is a crossbar interconnect that allows the load/store unit 766 to implement load and store operations between the shared memory 770 and the register file 758. The register file 758 can operate at the same frequency as the GPGPU cores 762, thus data transfer between the GPGPU cores 762 and the register file 758 is very low latency. The shared memory 770 can be used to enable communication between threads that execute on the functional units within the graphics multiprocessor 734. The cache memory 772 can be used as a data cache for example, to cache texture data communicated between the functional units and the texture unit 736. The shared memory 770 can also be used as a program managed cached. The shared memory 770 and the cache memory 772 can couple with the data crossbar 740 to enable communication with other components of the processing cluster. Threads executing on the GPGPU cores 762 can programmatically store data within the shared memory in addition to the automatically cached data that is stored within the cache memory 772.

Figure 8:
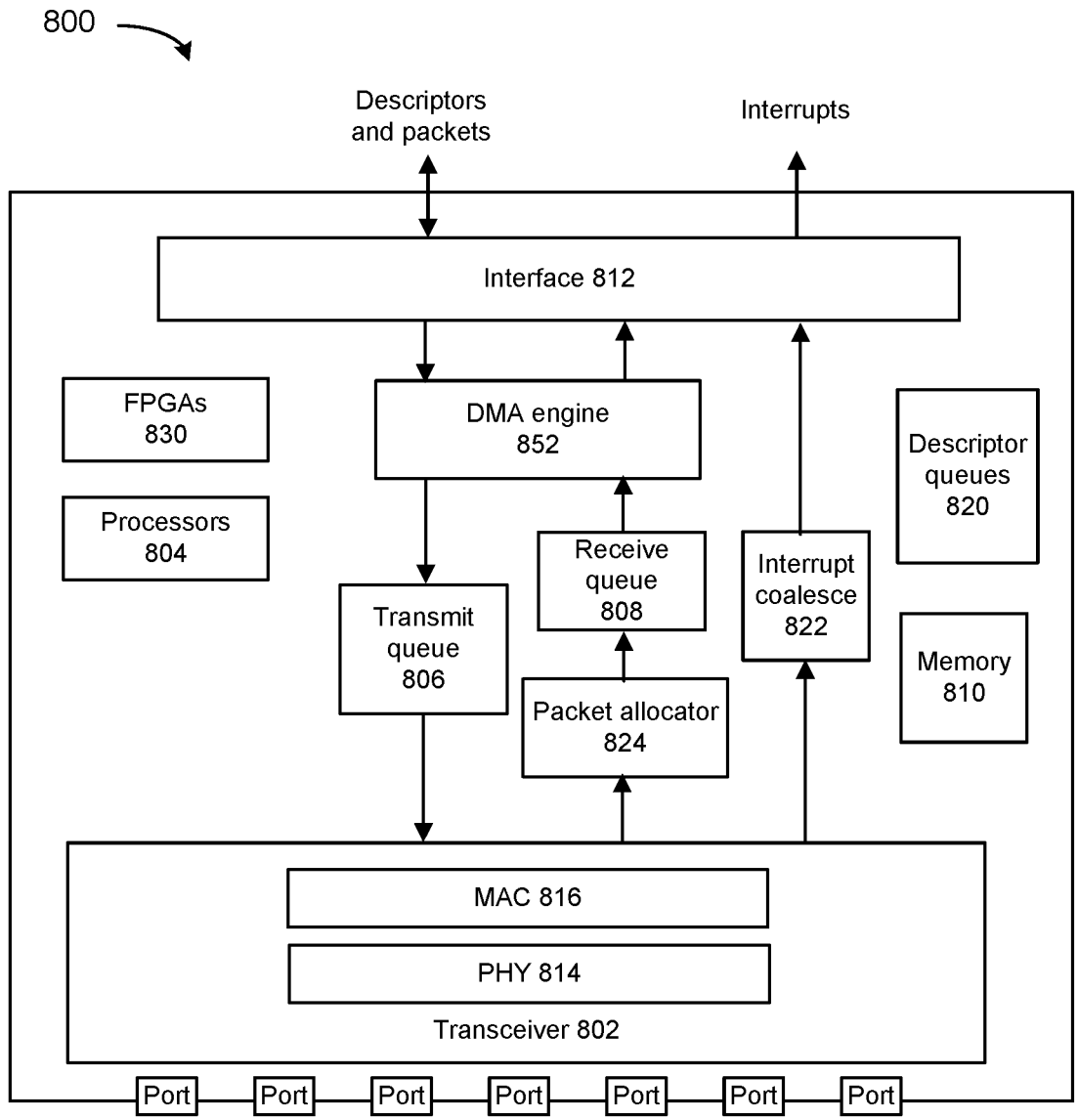
FIG. 8 depicts an example network interface.

FIG. 8 depicts an example network interface device. Various hardware and software resources in the network interface can be configured by another network interface device with CSP configurations, as described herein. In some examples, network interface 800 can be implemented as a network interface controller, network interface card, a host fabric interface (HFI), or host bus adapter (HBA), and such examples can be interchangeable. Network interface 800 can be coupled to one or more servers using a bus, PCIe, CXL, or DDR. Network interface 800 may be embodied as part of a system-on-a-chip (SoC) that includes one or more processors, or included on a multichip package that also contains one or more processors.

Some examples of network device 800 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 800 can include transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to perform MAC address filtering on received packets, process MAC headers of received packets by verifying data integrity, remove preambles and padding, and provide packet content for processing by higher layers. MAC circuitry 816 can be configured to assemble data to be transmitted into packets, that include destination and source addresses along with network control information and error detection hash values.

Processors 804 can be any a combination of: a processor, core, graphics processing unit (GPU), field programmable gate array (FPGA), application specific integrated circuit (ASIC), or other programmable hardware device that allow programming of network interface 800. For example, a "smart network interface" or SmartNIC can provide packet processing capabilities in the network interface using processors 804.

Processors 804 can include a programmable processing pipeline that is programmable by one or more of: Protocol-independent Packet Processors (P4), Software for Open Networking in the Cloud (SONiC), Broadcom® Network Programming Language (NPL), NVIDIA® CUDA®, NVIDIA® DOCA™, Infrastructure Programmer Development Kit (IPDK), or x86 compatible executable binaries or other executable binaries. A programmable processing pipeline can include one or more match-action units (MAUs) that can schedule packets for transmission using one or multiple granularity lists, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content.

Packet allocator 824 can provide distribution of received packets for processing by multiple CPUs or cores using receive side scaling (RSS). When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with or based at least in part on PCI, PCI Express, PCI-x, Serial ATA, and/or USB (although other interconnection standards may be used), or proprietary variations thereof.

Figure 9:
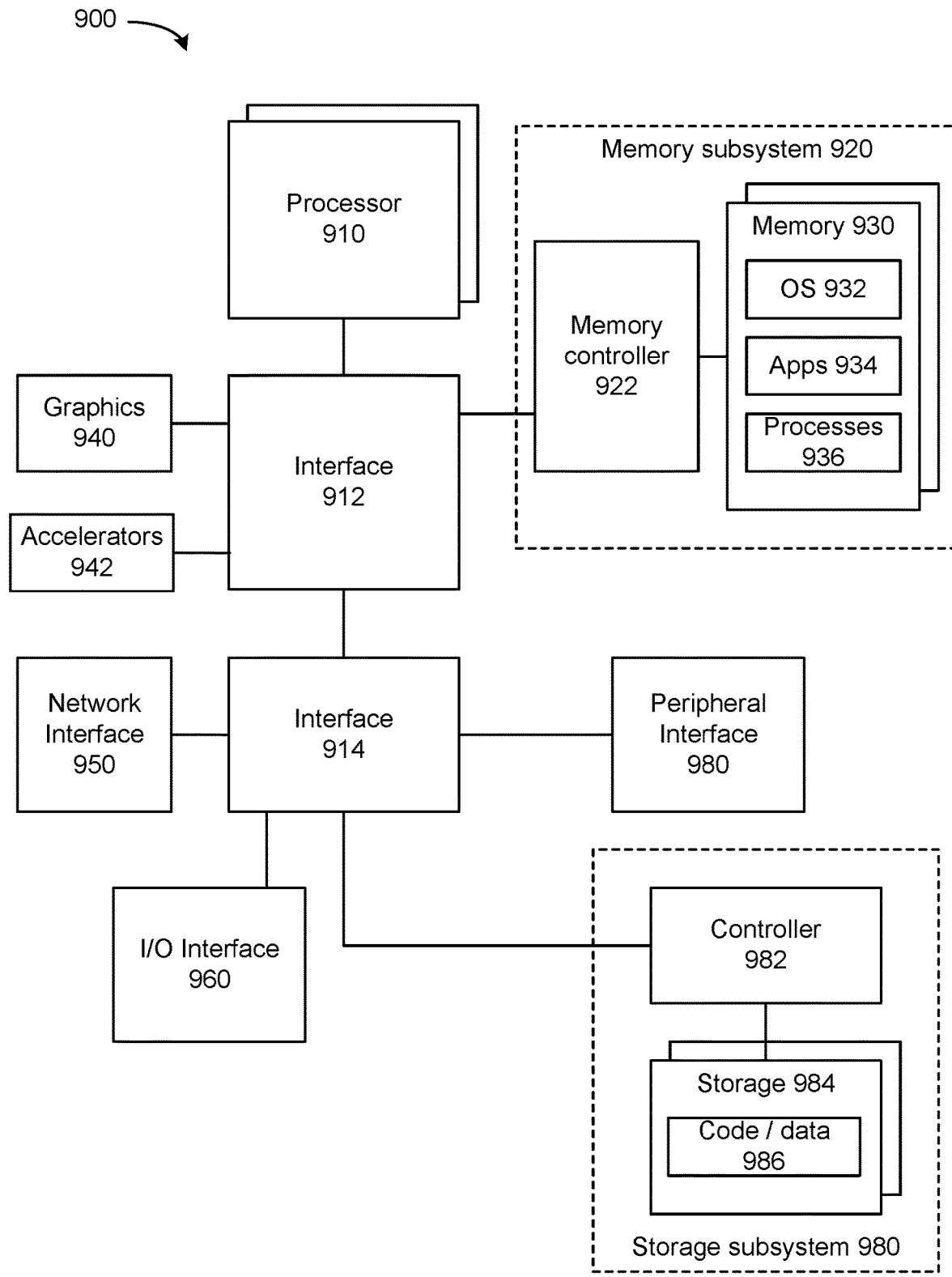
FIG. 9 depicts a system.

FIG. 9 depicts an example computing system. Components of system 900 can configure NICs of a GPU with integrated or connected NICs. Components of system 900 can utilize a GPU with integrated or connected NICs for GPU-to-GPU communication, as described herein. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. In some examples, a CPU and GPU can be integrated into a single package. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a fixed function or programmable offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU socket (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 942 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In some examples, applications 934 can request GPU-to-GPU communication using integrated or connected NICs, as described herein.

In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

In some examples, OS 932 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, NVIDIA®, Broadcom®, Qualcomm®, IBM®, Texas Instruments®, among others.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include stand-alone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 (e.g., packet processing device) can execute a virtual switch to provide virtual machine-to-virtual machine communications for virtual machines (or containers, microservices, or other virtual execution environments) in a same server or among different servers.

Some examples of network interface 950 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Graphics 940, accelerators 942, and/or network interface 950 can include Direct memory access (DMA) circuitry that can copy data to or from host memory, instead of copying the packet to an intermediate buffer at the host and then using another copy operation from the intermediate buffer to the destination buffer.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). Another example of volatile memory includes cache or static random access memory (SRAM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, or NVM devices that use chalcogenide phase change material (for example, chalcogenide glass).

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMB A) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Communications between devices can take place using a network that provides die-to-die communications; chip-to-chip communications; circuit board-to-circuit board communications; and/or package-to-package communications.

Figure 10:
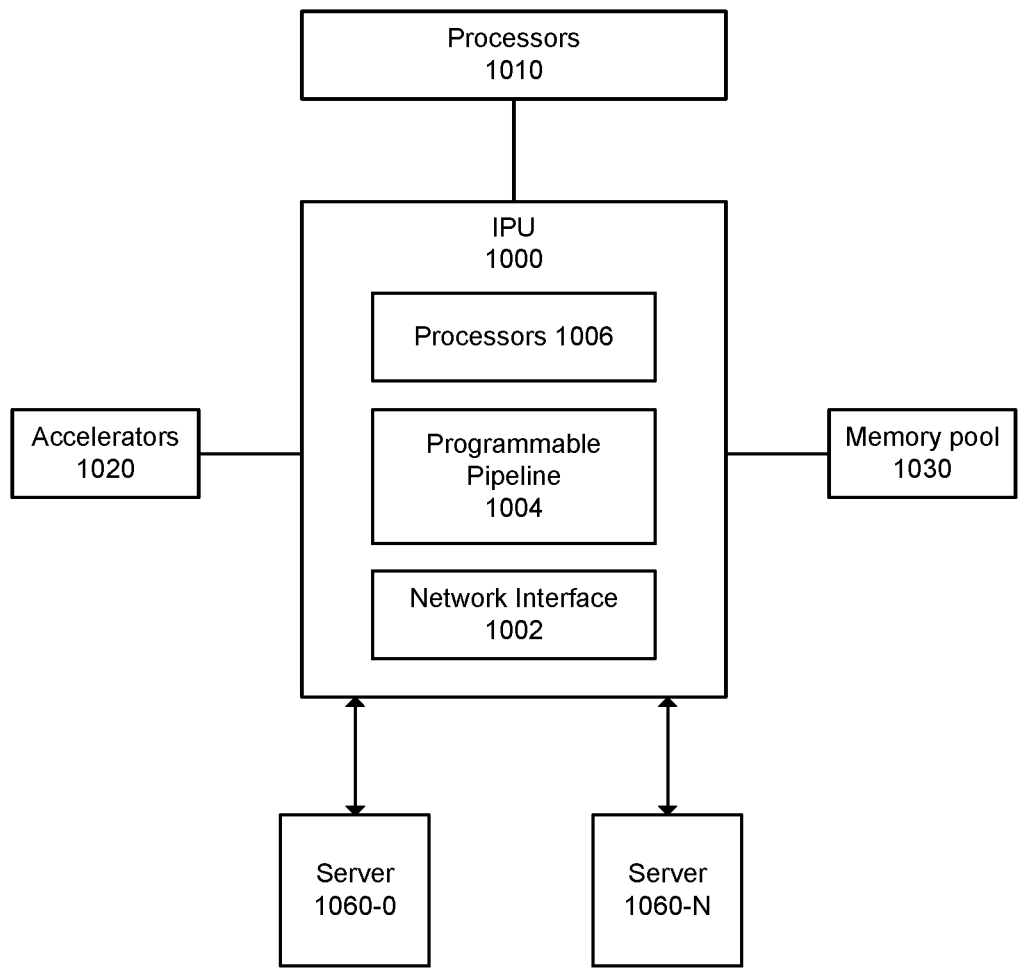
FIG. 10 depicts a system.

FIG. 10 depicts an example system. In this system, IPU 1000 manages performance of one or more processes using one or more of processors 1006, processors 1010, accelerators 1020, memory pool 1030, or servers 1040-0 to 1040-N, where N is an integer of 1 or more. In some examples, network interface device 210 can be implemented to include at least some components of IPU 1000. In some examples, processors 1006 of IPU 1000 can execute one or more processes, applications, VMs, containers, microservices, and so forth that request performance of workloads by one or more of: processors 1010, accelerators 1020, memory pool 1030, and/or servers 1040-0 to 1040-N. IPU 1000 can utilize network interface 1002 or one or more device interfaces to communicate with processors 1010, accelerators 1020, memory pool 1030, and/or servers 1040-0 to 1040-N. IPU 1000 can utilize programmable pipeline 1004 to process packets that are to be transmitted from network interface 1002 or packets received from network interface 1002. Programmable pipeline 1004 and/or processors 1006 can be configured to perform configuration of data planes of NICs connected to or integrated into GPUs, as described herein.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writable or re-writable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

References to standards herein can refer to earlier versions, later versions, or derivatives one or more versions of a standard.

Example 1 includes one or more examples, and includes an apparatus comprising: a first graphics processing unit (GPU) comprising at least one integrated network interface controller (NIC), wherein a data plane of the at least one integrated NIC is configured by a particular entity.

Example 2 includes one or more examples, wherein the data plane of the at least one integrated NIC is configured by the particular entity as a control plane but the first GPU and a central processing unit (CPU) are prevented from configuring the data plane of the at least one integrated NIC.

Example 3 includes one or more examples, wherein the data plane of the at least one integrated NIC is configured by the particular entity in one or more of: reliability protocol, packet encryption, packet decryption, network protocol to utilize, frame format to utilize, permitted destination for packets, or permitted source for packets.

Example 4 includes one or more examples, wherein the first GPU is to send packets to a second GPU using the at least one integrated NIC or coupled NIC.

Example 5 includes one or more examples, comprising circuitry to permit the particular entity to configure the data plane of the at least one integrated NIC but prevent the first GPU or a central processing unit (CPU) to configure the data plane of the at least one integrated NIC.

Example 6 includes one or more examples, comprising a network interface device, wherein the particular entity is to configure the data plane of the at least one integrated NIC using the network interface device.

Example 7 includes one or more examples, comprising a first memory associated with the first GPU and a second memory associated with a second GPU, wherein the first memory comprises a source of data and the second memory comprises a destination of data.

Example 8 includes one or more examples, wherein the first GPU comprises one or more multiprocessors comprising one or more of: single-instruction multiple thread (SIMT) execution circuitry, Single Instruction/Multiple Data (SIMD) execution circuitry, one or more tensor cores, a thread dispatcher, or a thread scheduler.

Example 9 includes one or more examples, comprising: a first server comprising the first GPU.

Example 10 includes one or more examples, comprising: a data center comprising a second server comprising a second GPU communicatively coupled to the first server.

Example 11 includes one or more examples, and includes a non-transitory computer-readable medium comprising instructions stored thereon, that if executed, cause one or more processors to: configure data planes of one or more network interface devices integrated into a graphics processing unit (GPU) by a second network interface device, wherein the second network interface device has exclusive capability to configure the data planes of one or more network interface devices integrated into the GPU.

Example 12 includes one or more examples, wherein a cloud service provider (CSP) is to configure the data planes of one or more network interface devices integrated into the GPU.

Example 13 includes one or more examples, wherein the data planes of one or more network interface devices are to be configured in one or more of: reliability protocol, packet encryption, packet decryption, network protocol to utilize, frame format to utilize, permitted destination for packets, or permitted source for packets.

Example 14 includes one or more examples, wherein the graphics processing unit is to send packets to a second graphics processing unit using the one or more network interface devices.

Example 15 includes one or more examples, wherein a smartNIC is to configure the data planes of the one or more network interface devices but the GPU and a central processing unit (CPU) are not permitted to configure the data planes of the one or more network interface devices.

Example 16 includes one or more examples, and includes a method comprising: receiving a configuration for one or more network interface devices integrated into a graphics processing unit (GPU), wherein the receiving a configuration for one or more network interface devices integrated into the GPU comprises receiving the configuration at a second network interface device and configuring data plane circuitry of the one or more network interface devices based on the configuration, wherein the second network interface device is provided with exclusive capability to configure the data plane circuitry of the network interface devices.

Example 17 includes one or more examples, wherein the data plane circuitry of the one or more network interface devices are to be configured in one or more of: reliability protocol, packet encryption, packet decryption, network protocol to utilize, frame format to utilize, permitted destination for packets, or permitted source for packets.

Example 18 includes one or more examples, wherein the GPU is to send packets to a second graphics processing unit using the one or more network interface devices.

Example 19 includes one or more examples, wherein the second network interface device comprises a smartNIC.

Example 20 includes one or more examples, and includes accessing a memory of a GPU or network connected memory via at least one of the one or more network interface devices.

What is claimed is:

1. An apparatus comprising:
   a first graphics processing unit (GPU) comprising at least one integrated network interface controller (NIC), wherein a data plane of the at least one integrated NIC is configured by a control plane of a second NIC but not by the first GPU and wherein the at least one integrated NIC comprises packet processing circuitry that processes packets and is configured as the data plane.

2. The apparatus of claim 1, wherein the data plane of the at least one integrated NIC is configured by the second NIC as a control plane but the first GPU and a central processing unit (CPU) are prevented from configuring the data plane of the at least one integrated NIC.

3. The apparatus of claim 1, wherein the data plane of the at least one integrated NIC is configured by the second NIC in one or more of: reliability protocol, packet encryption, packet decryption, network protocol to utilize, frame format to utilize, permitted destination for packets, or permitted source for packets.

4. The apparatus of claim 1, wherein the first GPU is to send packets to a second GPU using the at least one integrated NIC.

5. The apparatus of claim 1, comprising circuitry to permit the second NIC to configure the data plane of the at least one integrated NIC but prevent the first GPU or a central processing unit (CPU) to configure the data plane of the at least one integrated NIC.

6. The apparatus of claim 1, comprising a network interface device, wherein the second NIC is to configure the data plane of the at least one integrated NIC using the network interface device.

7. The apparatus of claim 1, comprising a first memory associated with the first GPU and a second memory associated with a second GPU, wherein the first memory comprises a source of data and wherein the first GPU is to cause copying of the data to the second memory.

8. The apparatus of claim 1, wherein the first GPU comprises one or more multiprocessors comprising one or more of: single-instruction multiple thread (SIMT) execution circuitry, Single Instruction/Multiple Data (SIMD) execution circuitry, one or more tensor cores, a thread dispatcher, or a thread scheduler.

9. The apparatus of claim 1, comprising:
   a first server comprising the first GPU.

10. The apparatus of claim 9, comprising:
    a data center comprising a second server comprising a second GPU communicatively coupled to the first server.

11. At least one non-transitory computer-readable medium comprising instructions stored thereon, that if executed, cause one or more processors to:
    configure data planes of one or more network interface devices integrated into a graphics processing unit (GPU) by a control plane of a second network interface device, wherein the second network interface device has exclusive capability to configure data planes of one or more network interface devices integrated into the GPU, wherein the GPU is not to configure the data planes of the one or more network interface devices integrated into the GPU, and wherein the data planes of the one or more network interface devices comprise packet processing circuitries that process packets.

12. The computer-readable medium of claim 11, wherein a cloud service provider (CSP) is to configure the data planes of the one or more network interface devices integrated into the GPU via the second network interface device.

13. The computer-readable medium of claim 11, wherein the data planes of the one or more network interface devices are to be configured in one or more of: reliability protocol, packet encryption, packet decryption, network protocol to utilize, frame format to utilize, permitted destination for packets, or permitted source for packets.

14. The computer-readable medium of claim 11, wherein the graphics processing unit is to send packets to a second graphics processing unit using the one or more network interface devices.

15. The computer-readable medium of claim 11, wherein a central processing unit (CPU) is not permitted to configure the data planes of the one or more network interface devices.

16. A method comprising:
    receiving a configuration for one or more network interface devices integrated into a graphics processing unit (GPU), wherein the receiving a configuration for one or more network interface devices integrated into the GPU comprises receiving the configuration from a control plane of a second network interface device and
    configuring data plane circuitry of the one or more network interface devices based on the configuration, wherein the second network interface device is provided with exclusive capability to configure the data plane circuitries of the network interface devices, wherein the GPU is not permitted to configure the data plane circuitries of the network interface devices, and wherein the data plane circuitries of the one or more network interface devices comprise packet processing circuitries that process packets.

17. The method of claim 16, wherein the data plane circuitries of the one or more network interface devices are to be configured in one or more of: reliability protocol, packet encryption, packet decryption, network protocol to utilize, frame format to utilize, permitted destination for packets, or permitted source for packets.

18. The method of claim 16, wherein the GPU is to send packets to a second graphics processing unit using the one or more network interface devices.

19. The method of claim 16, wherein the second network interface device comprises a smartNIC.

20. The method of claim 16, comprising:

accessing a memory of a GPU or network connected memory via at least one of the one or more network interface devices.

* * * * *